United States Patent
Yin et al.

(12) 
(10) Patent No.: US 12,525,009 B2
(45) Date of Patent: Jan. 13, 2026

(54) PRUNING A VISION TRANSFORMER

(71) Applicant: NVIDIA Corporation, Santa Clara, CA (US)

(72) Inventors: Hongxu Yin, San Jose, CA (US); Huanrui Yang, Durham, NC (US); Pavlo Molchanov, San Jose, CA (US); Jan Kautz, Lexington, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1065 days.

(21) Appl. No.: 17/551,005

(22) Filed: Dec. 14, 2021

(65) Prior Publication Data

US 2023/0080247 A1  Mar. 16, 2023

Related U.S. Application Data

(60) Provisional application No. 63/238,699, filed on Aug. 30, 2021.

(51) Int. Cl.
*G06V 10/94* (2022.01)
*G06V 10/70* (2022.01)

(52) U.S. Cl.
CPC ............ *G06V 10/94* (2022.01); *G06V 10/70* (2022.01)

(58) Field of Classification Search
None
See application file for complete search history.

(56) References Cited

PUBLICATIONS

Zhu et al. ("Vision Transformer Pruning").(Year: 2021).*
Vaswani et al. ("Attention is All You Need"). (Year: 2017).*
Dosovitskiy (An Image is Worth 16 X 16 Words: Transformer for Image Recognition at Scale). (Year: 2021).*
Molchanov et al. ("Importance Estimation for Neural Network Pruning"). (Year: 2019).*
Alkhouli et al. ("On the Alignment Problem in Multi-head Attention-Based Neural Machine Translation"). (Year: 2018).*
Yu et al. ("HFP: Hardware-Aware Filter Pruning for Deep Convolutional Neural Networks Acceleration").(Year: 2021).*
Michel et al. ("Are Sixteen Heads Really Better than One?") (Year:2019). (Year: 2019).*
Yang et al ("NetAdapt: Platform-Aware Neural Network Adaptation for Mobile Applications").Yang (Year: 2018).*
He et al. ("Asymptotic Soft Filter Pruning for Deep Convolutional Neural Networks"). He (Year: 2020).*
Zhang et al. ("Know what you don't need: Single-Shot Meta-Pruning for attention heads"). Zhang (Year: 2021).*

(Continued)

*Primary Examiner* — Chan S Park
(74) *Attorney, Agent, or Firm* — Zilka-Kotab, P.C.

(57) ABSTRACT

A vision transformer is a deep learning model used to perform vision processing tasks such as image recognition. Vision transformers are currently designed with a plurality of same-size blocks that perform the vision processing tasks. However, some portions of these blocks are unnecessary and not only slow down the vision transformer but use more memory than required. In response, parameters of these blocks are analyzed to determine a score for each parameter, and if the score falls below a threshold, the parameter is removed from the associated block. This reduces a size of the resulting vision transformer, which reduces unnecessary memory usage and increases performance.

20 Claims, 8 Drawing Sheets

(56) References Cited

PUBLICATIONS

Ramanathan et al. ("Look-Up Table based Energy Efficient Processing in Cache Support for Neural Network Acceleration") Ramanathan (Year: 2020).*

Elkerdawy et al. "To Filter Prune, or to Layer Prune, That is The Question", Nov. 8, 2020, pp. 1-26 (Year: 2020).*

* cited by examiner

PRUNING A VISION TRANSFORMER

FIELD OF THE INVENTION

The present invention relates to image rendering, and more particularly to compressing a vision transformer to improve its performance.

BACKGROUND

Modern deep vision transformers (ViTs) have demonstrated state-of-the-art accuracy for a wide variety of tasks, including object recognition and semantic segmentation. While training may take place on high-performance GPUs, deployment of large networks is often made in time-sensitive, low power settings. With tasks such as pedestrian and vehicle detection in advanced driver assistance systems (ADAS) or streaming video processing or classification, frames per second (FPS) of classifier inference often needs to match the incoming video rate. There is therefore a need to improve a performance (e.g., a memory usage and throughput) of ViTs.

DETAILED DESCRIPTION

A vision transformer is a deep learning model used to perform vision processing tasks such as image recognition. Vision transformers are currently designed with a plurality of same-size blocks that perform the vision processing tasks. However, some portions of these blocks are unnecessary and not only slow down the vision transformer but use more memory than required. In response, parameters of these blocks are analyzed to determine a score for each parameter, and if the score falls below a threshold, the parameter is removed from the associated block. This reduces a size of the resulting vision transformer, which reduces unnecessary memory usage and increases performance.

Figure 1:
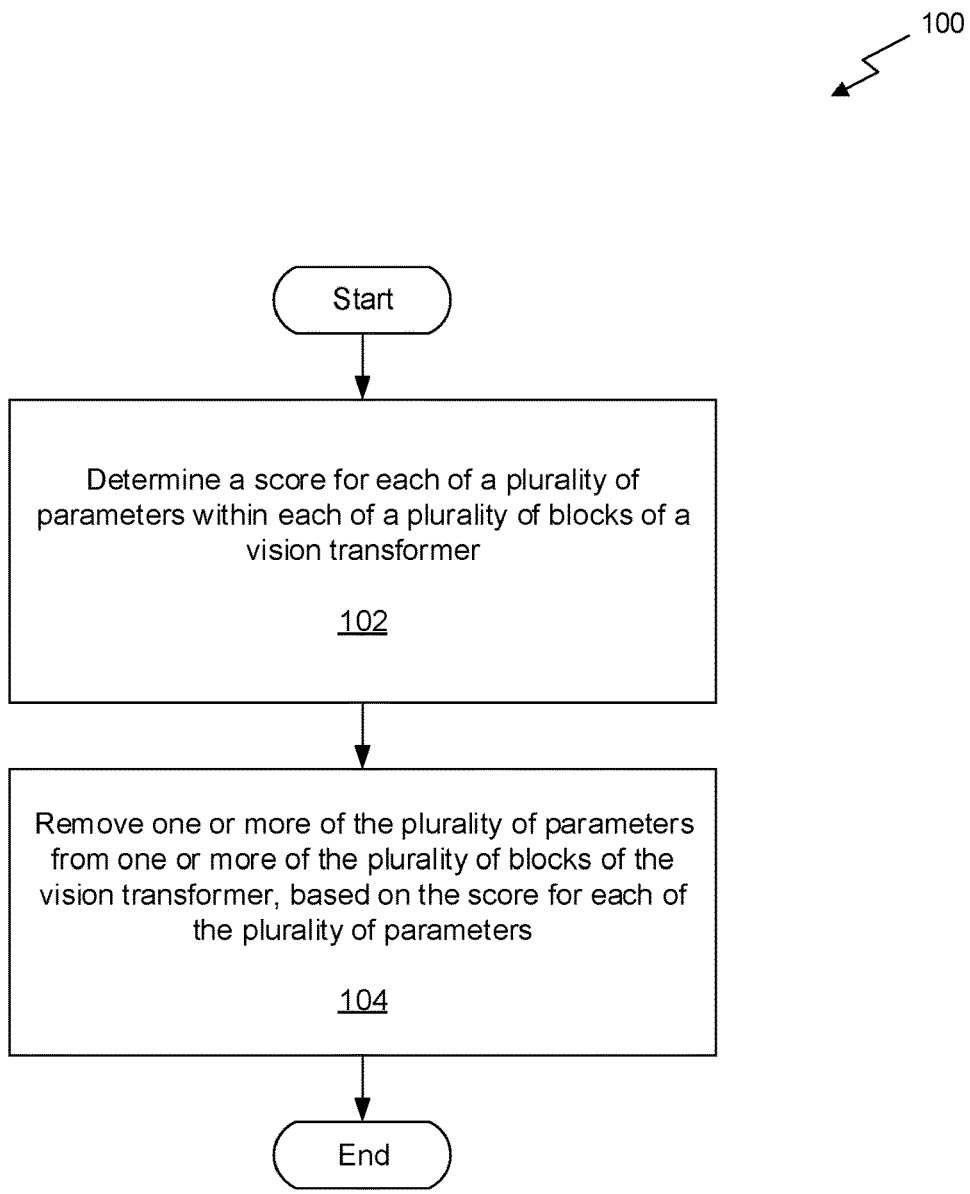
FIG. 1 illustrates a flowchart of a method for pruning a vision transformer, in accordance with an embodiment.

FIG. 1 illustrates a flowchart of a method 100 for pruning a vision transformer, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processing element. Furthermore, persons of ordinary skill in the art will understand that any system that performs method 100 is within the scope and spirit of embodiments of the present invention.

As shown in operation 102, a score is determined for each of a plurality of parameters within each of a plurality of blocks of a vision transformer. In one embodiment, the vision transformer may include a transformer deep learning model. In another embodiment, the vision transformer may implement an attention technique by differentially weighting the significance of each part of input data. In yet another embodiment, the vision transformer may include a transformer designed to perform vision processing tasks (e.g., image recognition, semantic segmentation, etc.). For example, the vision transformer may divide an input image into portions which are sent through transformer blocks that utilize attention to analyze the input image by monitoring how each portion interacts with the other portions of the input image.

Additionally, in one embodiment, the plurality of blocks of the vision transformer may include components of the vision transformer. In another embodiment, each of the plurality of blocks of the vision transformer may include an attention block. In yet another embodiment, each block may include a plurality of components. For example, the components may include a QKV projection component, a multi-head attention component, a multi-layer perceptron, etc.

Further, in one embodiment, each of the plurality of blocks may include the plurality of parameters. For example, the plurality of parameters may include an embedding dimension shared across all blocks (EMB), a number of heads in MSA for the block (H), an output dimension of a Q and K projection per head in MSA (QK), an output dimension of a V projection and an input dimension of the PROJ per head (V), a hidden dimension of MLP per block (MLP), etc.

Further still, in one embodiment, all of the plurality of blocks of the vision transformer may initially have the same size. For example, each of the plurality of blocks of the vision transformer may initially have the same parameters as the other blocks. In another embodiment, the score determined for each of the plurality of parameters may include a global importance ranking.

Also, in one embodiment, the global importance ranking for each parameter may be determined utilizing both the first-order Taylor importance and the potential latency improvement provided by pruning each neuron within each of the plurality of blocks. For example, an importance value may be measured by a difference in loss, a first-order Taylor expansion may be performed, and a Taylor importance score may be determined for each parameter. In another embodiment, the potential latency improvement may be estimated by linearly interpolating a lookup table of attention block latency given current EMB, H, QK, V and MLP dimensions of each block in the vision transformer.

In addition, as shown in operation 104, one or more of the plurality of parameters are removed from one or more of the plurality of blocks of the vision transformer, based on the score for each of the plurality of parameters. In one embodiment, prior to parameter removal, explicit head alignment may be performed by reshaping head components of each of the plurality of blocks to facilitate parameter pruning/removal.

For example, each of the plurality of blocks may include a plurality of heads, and each of the plurality of heads may learn different information to perform attention mapping within the vision transformer. In another example, QK×H dimensions of the head may be reshaped and converted to a 3D tensor. In yet another example, the concatenation with projection operations performed within each head may be reordered to perform projection before concatenation. This may isolate the H dimension within each block (so that it may be optionally pruned/removed based on its global importance ranking).

Furthermore, in one embodiment, the score for each of the plurality of parameters may be compared to one or more predetermined thresholds. In another embodiment, in response to determining that a score for a parameter does not meet or exceed the predetermined thresholds, the parameter may be removed from its corresponding block of the vision transformer.

Further still, in one embodiment, removing a parameter from a block may include adjusting a weight associated with the parameter. For example, the weight associated with the parameter may be reduced, set to zero, etc. In another embodiment, removing a parameter from a block of the vision transformer may result in a compressed block of the vision transformer. In yet another embodiment, a plurality of blocks of the vision transformer may be compressed simultaneously.

Also, in one embodiment, removing one or more of the plurality of parameters from one or more of the plurality of blocks of the vision transformer may result in a compressed/pruned vision transformer. In another embodiment, one or more parameters may be removed from a first block of the vision transformer, but may not be removed from a second block of the vision transformer. This may result in different sized blocks within the compressed/pruned vision transformer.

In this way, a vision transformer may be compressed/pruned based on an analysis of the vision transformer. This compression/pruning may result in a compressed/pruned vision transformer that, when implemented utilizing one or more hardware computing devices, may reduce an amount of memory usage and allow an increase in throughput within the hardware computing device(s) when compared to implementing the original vision transformer.

The compressed/pruned vision transformer may be implemented utilizing one or more computing devices, one or more networked/distributed computing systems, one or more cloud computing devices, etc. The compressed/pruned vision transformer may be utilized to perform one or more automated driving/navigation tasks (such as image recognition, pedestrian and/or vehicle detection, etc.).

Additionally, in one embodiment, the above parameter removal may enable ampere sparsity. For example, the compressed/pruned vision transformer may be adjusted via explicit head alignment and score-based parameter removal to meet one or more structural constraints of predetermined hardware (e.g., specific dimensions, etc.).

In another embodiment, the difference in loss used to determine the importance value may also be used to train pruned/compressed vision transformers for performance recovery. In yet another embodiment, knowledge distillation (e.g., conventional distillation laws (DEIT), full model distillation, etc.) may also be used to fine-tune the pruned/compressed vision transformers.

Further, in one embodiment, the pruned/compressed vision transformer may be analyzed to determine one or more heuristics. For example, these heuristics may include scaling rules implemented across all blocks within the pruned/compressed vision transformer. In another embodiment, these heuristics may be used during the design of a new vision transformer.

For example, an embedding size and scaling constant may be defined for a new vision transformer. In another example, this embedding size may then be scaled using the scaling constant across different latencies and parameter sizes within the new vision transformer. In yet another example, the embedding size and scaling constant may be jointly used to formulate one or more new vision transformers. For instance, a larger model may have a larger embedding, and scaling constants may only tune across blocks per model, while embedding dimensions may tune across models of varying sizes/latencies.

In this way, a new vision transformer class/family may be implemented that provides increased throughput and reduced memory usage.

Figure 2:
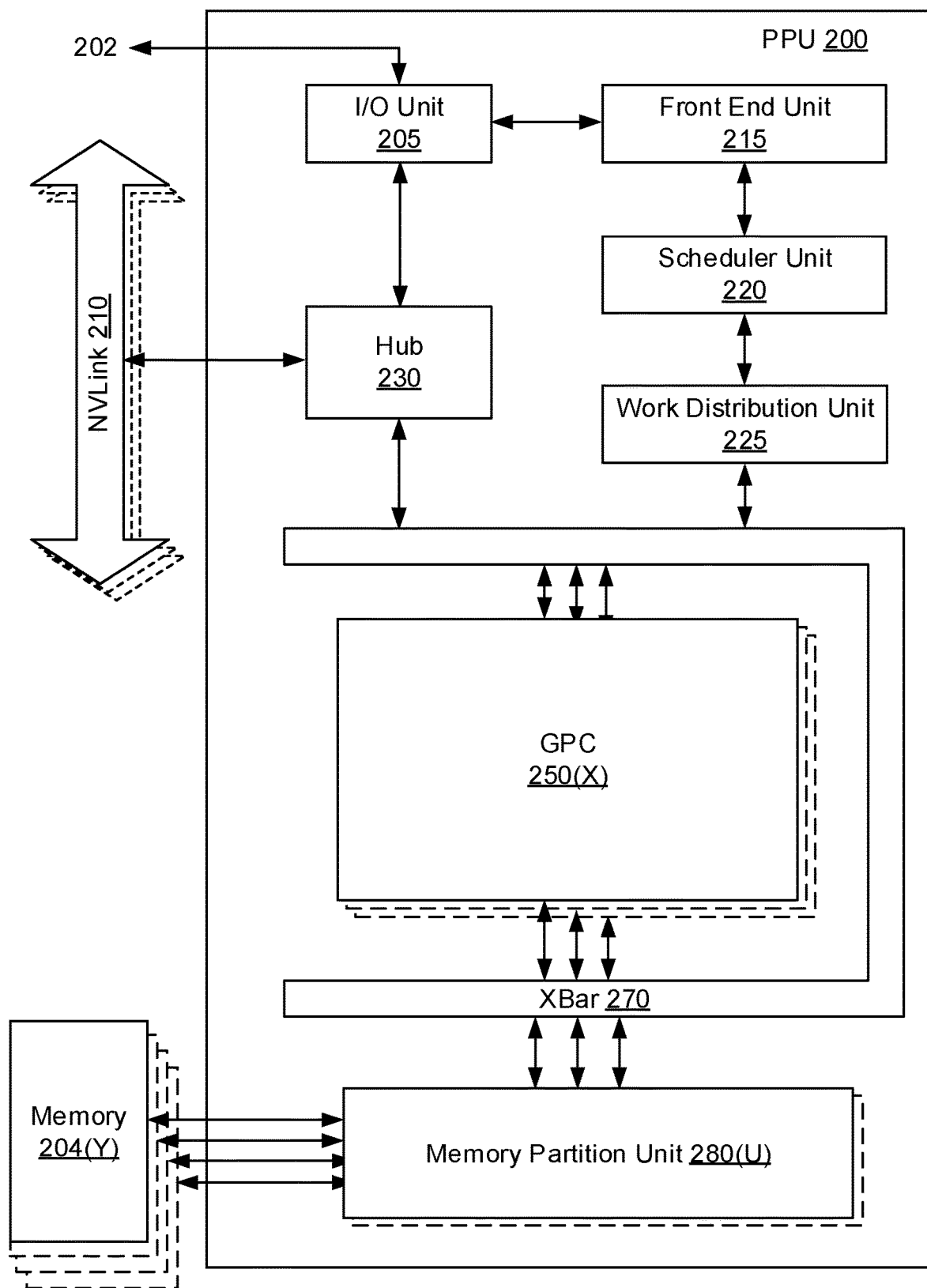
FIG. 2 illustrates a parallel processing unit, in accordance with an embodiment.

In yet another embodiment, the above functionality may be performed utilizing a parallel processing unit (PPU) such as the PPU 200 illustrated in FIG. 2.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

FIG. 2 illustrates a parallel processing unit (PPU) 200, in accordance with an embodiment. In an embodiment, the PPU 200 is a multi-threaded processor that is implemented on one or more integrated circuit devices. The PPU 200 is a latency hiding architecture designed to process many threads in parallel. A thread (i.e., a thread of execution) is an instantiation of a set of instructions configured to be executed by the PPU 200. In an embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 200 may be configured to accelerate thousands of High Performance Computing (HPC), data center, and machine learning applications. The PPU 200 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 2, the PPU 200 includes an Input/Output (I/O) unit 205, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other PPUs 200 via one or more high-speed NVLink 210 interconnect. The PPU 200 may be connected to a host processor or other peripheral devices via an interconnect 202. The PPU 200 may also be connected to a local memory comprising a number of memory devices 204. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 210 interconnect enables systems to scale and include one or more PPUs 200 combined with one or more CPUs, supports cache coherence between the PPUs 200 and CPUs, and CPU mastering. Data and/or commands may be transmitted by the NVLink 210 through the hub 230 to/from other units of the PPU 200 such as one or more copy engines, a video encoder, a video decoder, a power management unit, etc. (not explicitly shown). The NVLink 210 is described in more detail in conjunction with FIG. 4B.

The I/O unit 205 is configured to transmit and receive communications (i.e., commands, data, etc.) from a host processor (not shown) over the interconnect 202. The I/O unit 205 may communicate with the host processor directly via the interconnect 202 or through one or more intermediate devices such as a memory bridge. In an embodiment, the I/O unit 205 may communicate with one or more other processors, such as one or more the PPUs 200 via the interconnect 202. In an embodiment, the I/O unit 205 implements a Peripheral Component Interconnect Express (PCIe) interface for communications over a PCIe bus and the interconnect 202 is a PCIe bus. In alternative embodiments, the I/O unit 205 may implement other types of well-known interfaces for communicating with external devices.

The I/O unit 205 decodes packets received via the interconnect 202. In an embodiment, the packets represent commands configured to cause the PPU 200 to perform various operations. The I/O unit 205 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the I/O unit 205 is configured to route communications between and among the various logical units of the PPU 200.

In an embodiment, a program executed by the host processor encodes a command stream in a buffer that provides workloads to the PPU 200 for processing. A workload may comprise several instructions and data to be processed by those instructions. The buffer is a region in a memory that is accessible (i.e., read/write) by both the host processor and the PPU 200. For example, the I/O unit 205 may be configured to access the buffer in a system memory connected to the interconnect 202 via memory requests transmitted over the interconnect 202. In an embodiment, the host processor writes the command stream to the buffer and then transmits a pointer to the start of the command stream to the PPU 200. The front end unit 215 receives pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In an embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 may also be connected to the XBar 270 via the hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. The results can be transmitted to another PPU 200 or CPU via the NVLink 210. In an embodiment, the PPU 200 includes a number U of partition units 280 that is equal to the number of separate and distinct memory devices 204 coupled to the PPU 200. A partition unit 280 will be described in more detail below in conjunction with FIG. 3B.

In an embodiment, a host processor executes a driver kernel that implements an application programming interface (API) that enables one or more applications executing on the host processor to schedule operations for execution on the PPU 200. In an embodiment, multiple compute applications are simultaneously executed by the PPU 200 and the PPU 200 provides isolation, quality of service (QoS), and independent address spaces for the multiple compute applications. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 4A.

Figure 3A:
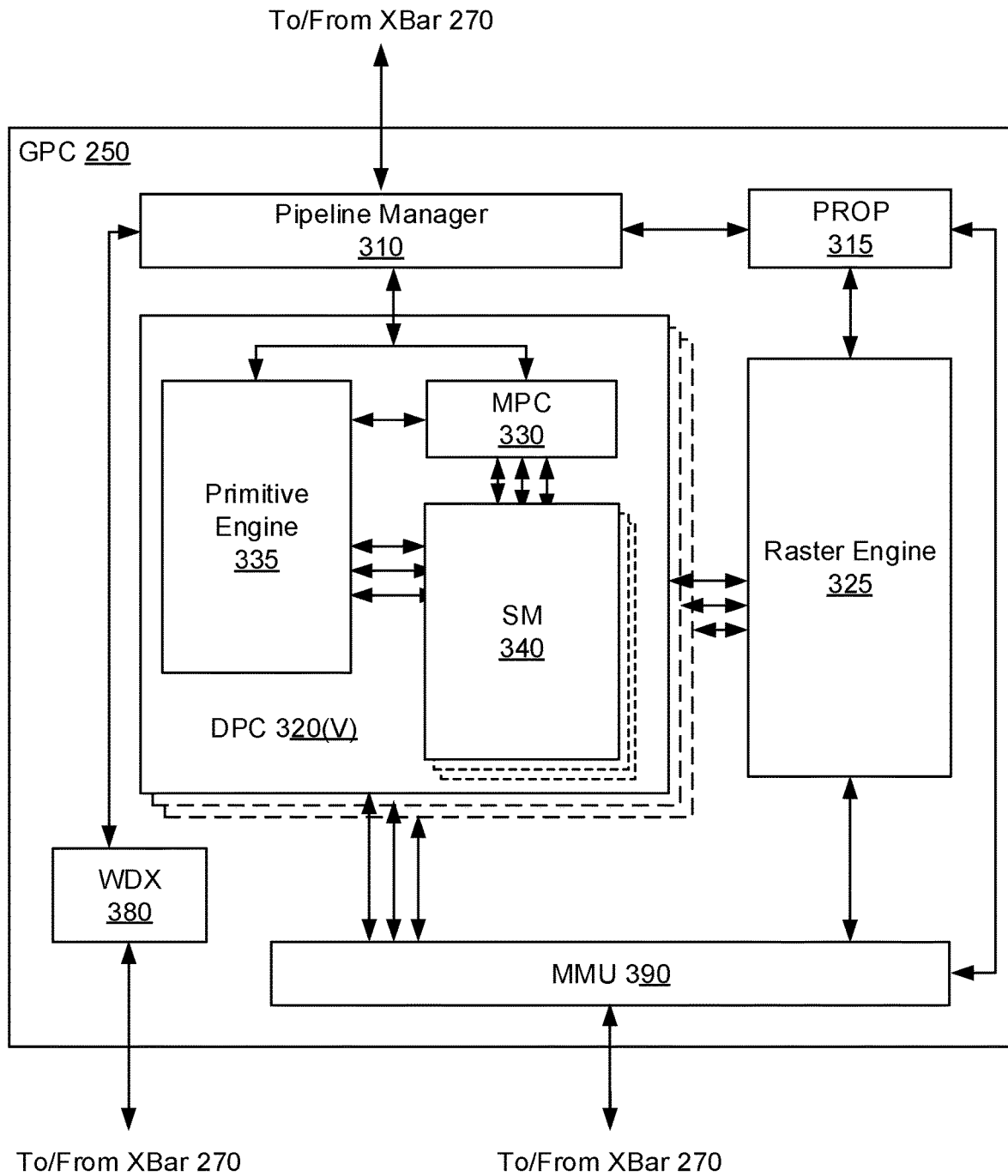
FIG. 3A illustrates a general processing cluster within the parallel processing unit of FIG. 2, in accordance with an embodiment.

FIG. 3A illustrates a GPC 250 of the PPU 200 of FIG. 2, in accordance with an embodiment. As shown in FIG. 3A, each GPC 250 includes a number of hardware units for processing tasks. In an embodiment, each GPC 250 includes a pipeline manager 310, a pre-raster operations unit (PROP) 315, a raster engine 325, a work distribution crossbar (WDX) 380, a memory management unit (MMU) 390, and one or more Data Processing Clusters (DPCs) 320. It will be appreciated that the GPC 250 of FIG. 3A may include other hardware units in lieu of or in addition to the units shown in FIG. 3A.

In an embodiment, the operation of the GPC 250 is controlled by the pipeline manager 310. The pipeline manager 310 manages the configuration of the one or more DPCs 320 for processing tasks allocated to the GPC 250. In an embodiment, the pipeline manager 310 may configure at least one of the one or more DPCs 320 to implement at least a portion of a graphics rendering pipeline. For example, a DPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the DPCs 320 for processing by the primitive engine 335 or the SM 340. In an embodiment, the pipeline manager 310 may configure at least one of the one or more DPCs 320 to implement a neural network model and/or a computing pipeline.

Figure 3B:
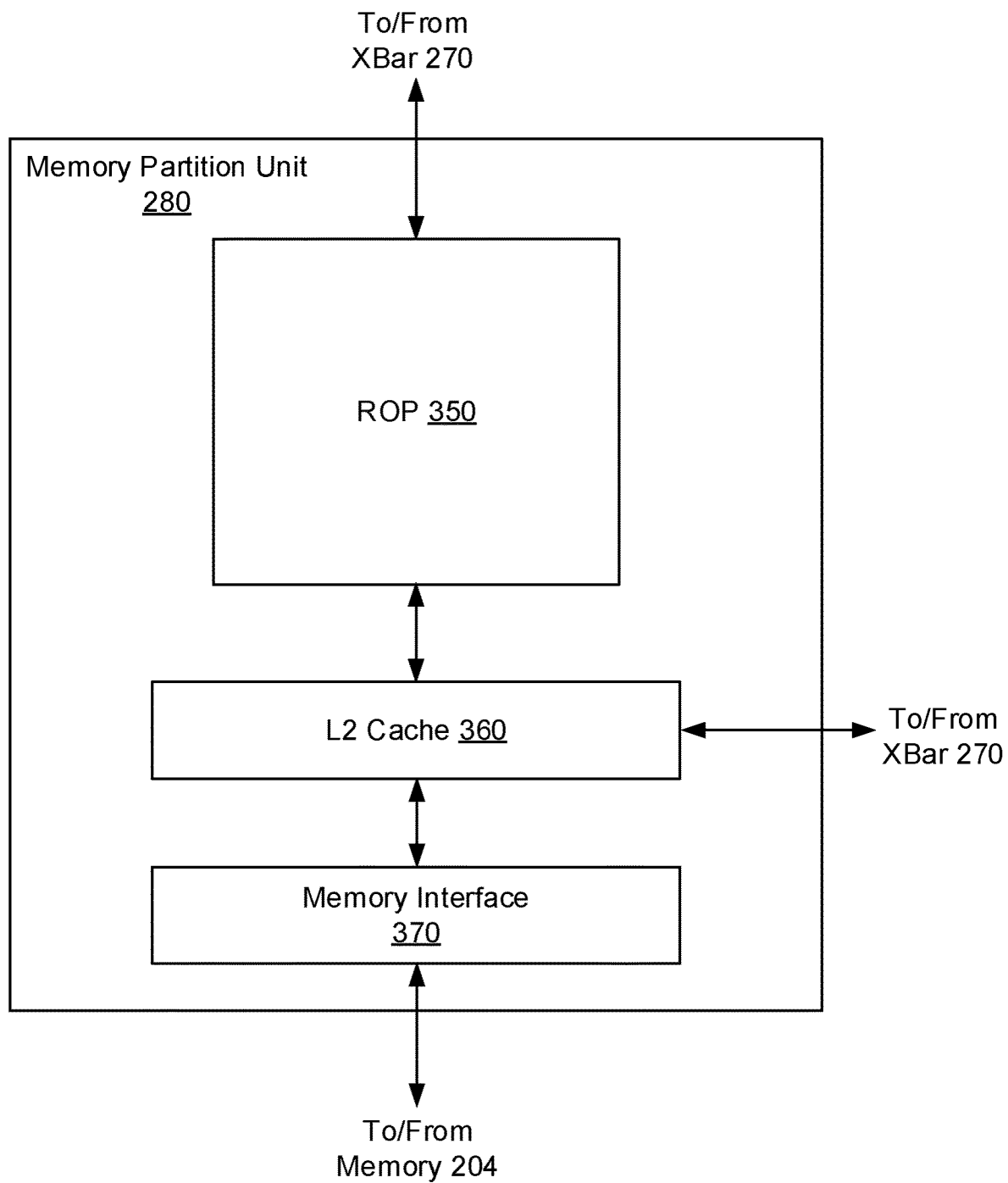
FIG. 3B illustrates a memory partition unit of the parallel processing unit of FIG. 2, in accordance with an embodiment.

The PROP unit 315 is configured to route data generated by the raster engine 325 and the DPCs 320 to a Raster Operations (ROP) unit, described in more detail in conjunction with FIG. 3B. The PROP unit 315 may also be configured to perform optimizations for color blending, organize pixel data, perform address translations, and the like.

The raster engine 325 includes a number of fixed function hardware units configured to perform various raster operations. In an embodiment, the raster engine 325 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 325 comprises fragments to be processed, for example, by a fragment shader implemented within a DPC 320.

Each DPC 320 included in the GPC 250 includes an M-Pipe Controller (MPC) 330, a primitive engine 335, and one or more SMs 340. The MPC 330 controls the operation of the DPC 320, routing packets received from the pipeline manager 310 to the appropriate units in the DPC 320. For example, packets associated with a vertex may be routed to the primitive engine 335, which is configured to fetch vertex attributes associated with the vertex from the memory 204. In contrast, packets associated with a shader program may be transmitted to the SM 340.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In an embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 340 will be described in more detail below in conjunction with FIG. 4A.

The MMU 390 provides an interface between the GPC 250 and the partition unit 280. The MMU 390 may provide translation of virtual addresses into physical addresses, memory protection, and arbitration of memory requests. In an embodiment, the MMU 390 provides one or more translation lookaside buffers (TLB s) for performing translation of virtual addresses into physical addresses in the memory 204.

FIG. 3B illustrates a memory partition unit 280 of the PPU 200 of FIG. 2, in accordance with an embodiment. As shown in FIG. 3B, the memory partition unit 280 includes a Raster Operations (ROP) unit 350, a level two (L2) cache 360, and a memory interface 370. The memory interface 370 is coupled to the memory 204. Memory interface 370 may implement 32, 64, 128, 1024-bit data buses, or the like, for high-speed data transfer. In an embodiment, the PPU 200 incorporates U memory interfaces 370, one memory interface 370 per pair of partition units 280, where each pair of partition units 280 is connected to a corresponding memory device 204. For example, PPU 200 may be connected to up to Y memory devices 204, such as high bandwidth memory stacks or graphics double-data-rate, version 5, synchronous dynamic random access memory, or other types of persistent storage.

In an embodiment, the memory interface 370 implements an HBM2 memory interface and Y equals half U. In an embodiment, the HBM2 memory stacks are located on the same physical package as the PPU 200, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 204 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 200 process very large datasets and/or run applications for extended periods.

In an embodiment, the PPU 200 implements a multi-level memory hierarchy. In an embodiment, the memory partition unit 280 supports a unified memory to provide a single unified virtual address space for CPU and PPU 200 memory, enabling data sharing between virtual memory systems. In an embodiment the frequency of accesses by a PPU 200 to memory located on other processors is traced to ensure that memory pages are moved to the physical memory of the PPU 200 that is accessing the pages more frequently. In an embodiment, the NVLink 210 supports address translation services allowing the PPU 200 to directly access a CPU's page tables and providing full access to CPU memory by the PPU 200.

In an embodiment, copy engines transfer data between multiple PPUs 200 or between PPUs 200 and CPUs. The copy engines can generate page faults for addresses that are not mapped into the page tables. The memory partition unit 280 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 204 or other system memory may be fetched by the memory partition unit 280 and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 performs graphics raster operations related to pixel color, such as color compression, pixel blending, and the like. The ROP unit 350 also implements depth testing in conjunction with the raster engine 325, receiving a depth for a sample location associated with a pixel fragment from the culling engine of the raster engine 325. The depth is tested against a corresponding depth in a depth buffer for a sample location associated with the fragment. If the fragment passes the depth test for the sample location, then the ROP unit 350 updates the depth buffer and transmits a result of the depth test to the raster engine 325. It will be appreciated that the number of partition units 280 may be different than the number of GPCs 250 and, therefore, each ROP unit 350 may be coupled to each of the GPCs 250. The ROP unit 350 tracks packets received from the different GPCs 250 and determines which GPC 250 that a result generated by the ROP unit 350 is routed to through the Xbar 270. Although the ROP unit 350 is included within the memory partition unit 280 in FIG. 3B, in other embodiments, the ROP unit 350 may be outside of the memory partition unit 280. For example, the ROP unit 350 may reside in the GPC 250 or another unit.

Figure 4A:
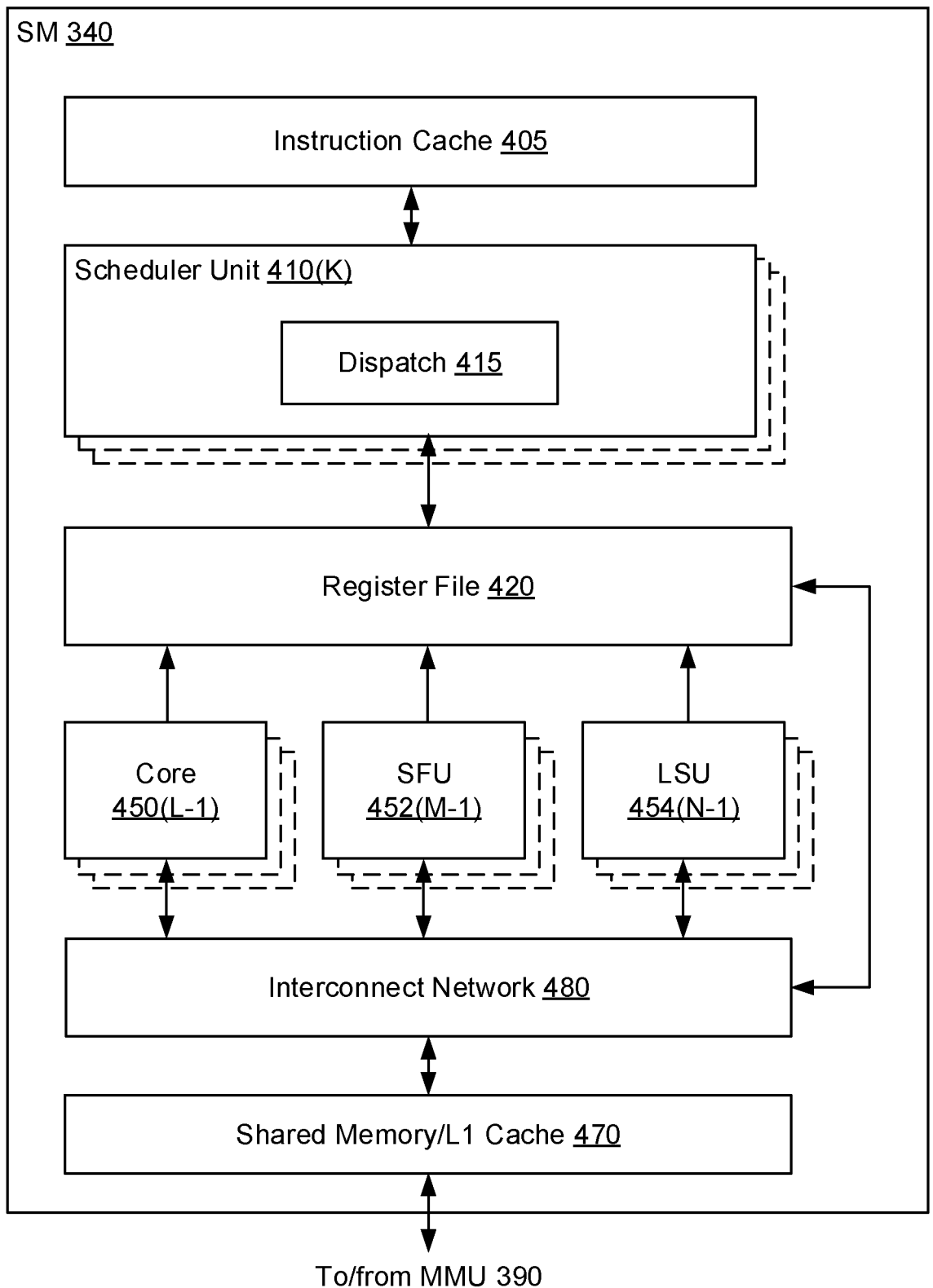
FIG. 4A illustrates the streaming multi-processor of FIG. 3A, in accordance with an embodiment.

FIG. 4A illustrates the streaming multi-processor 340 of FIG. 3A, in accordance with an embodiment. As shown in FIG. 4A, the SM 340 includes an instruction cache 405, one or more scheduler units 410(K), a register file 420, one or more processing cores 450, one or more special function units (SFUs) 452, one or more load/store units (LSUs) 454, an interconnect network 480, a shared memory/L1 cache 470.

As described above, the work distribution unit 225 dispatches tasks for execution on the GPCs 250 of the PPU 200. The tasks are allocated to a particular DPC 320 within a GPC 250 and, if the task is associated with a shader program, the task may be allocated to an SM 340. The scheduler unit 410(K) receives the tasks from the work distribution unit 225 and manages instruction scheduling for one or more thread blocks assigned to the SM 340. The scheduler unit 410(K) schedules thread blocks for execution as warps of parallel threads, where each thread block is allocated at least one warp. In an embodiment, each warp executes 32 threads. The scheduler unit 410(K) may manage a plurality of different thread blocks, allocating the warps to the different thread blocks and then dispatching instructions from the plurality of different cooperative groups to the various functional units (i.e., cores 450, SFUs 452, and LSUs 454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 415 is configured to transmit instructions to one or more of the functional units. In the embodiment, the scheduler unit 410(K) includes two dispatch units 415 that enable two different instructions from the same warp to be dispatched during each clock cycle. In alternative embodiments, each scheduler unit 410(K) may include a single dispatch unit 415 or additional dispatch units 415.

Each SM 340 includes a register file 420 that provides a set of registers for the functional units of the SM 340. In an embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In an embodiment, the SM 340 includes a large number (e.g., 128, etc.) of distinct processing cores 450. Each core 450 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 450 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 450. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 340 also comprises M SFUs 452 that perform special functions (e.g., attribute evaluation, reciprocal square root, and the like). In an embodiment, the SFUs 452 may include a tree traversal unit configured to traverse a hierarchical tree data structure. In an embodiment, the SFUs 452 may include texture unit configured to perform texture map filtering operations. In an embodiment, the texture units are configured to load texture maps (e.g., a 2D array of texels) from the memory 204 and sample the texture maps to produce sampled texture values for use in shader programs executed by the SM 340. In an embodiment, the texture maps are stored in the shared memory/L1 cache 370. The texture units implement texture operations such as filtering operations using mip-maps (i.e., texture maps of varying levels of detail). In an embodiment, each SM 240 includes two texture units.

Each SM 340 also comprises N LSUs 454 that implement load and store operations between the shared memory/L1 cache 470 and the register file 420. Each SM 340 includes an interconnect network 480 that connects each of the functional units to the register file 420 and the LSU 454 to the register file 420, shared memory/L1 cache 470. In an embodiment, the interconnect network 480 is a crossbar that can be configured to connect any of the functional units to any of the registers in the register file 420 and connect the LSUs 454 to the register file and memory locations in shared memory/L1 cache 470.

The shared memory/L1 cache 470 is an array of on-chip memory that allows for data storage and communication between the SM 340 and the primitive engine 335 and between threads in the SM 340. In an embodiment, the shared memory/L1 cache 470 comprises 128 KB of storage capacity and is in the path from the SM 340 to the partition unit 280. The shared memory/L1 cache 470 can be used to cache reads and writes. One or more of the shared memory/L1 cache 470, L2 cache 360, and memory 204 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 470 enables the shared memory/L1 cache 470 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 2, are bypassed, creating a much simpler programming model. In the general purpose parallel computation configuration, the work distribution unit 225 assigns and distributes blocks of threads directly to the DPCs 320. The threads in a block execute the same program, using a unique thread ID in the calculation to ensure each thread generates unique results, using the SM 340 to execute the program and perform calculations, shared memory/L1 cache 470 to communicate between threads, and the LSU 454 to read and write global memory through the shared memory/L1 cache 470 and the memory partition unit 280. When configured for general purpose parallel computation, the SM 340 can also write commands that the scheduler unit 220 can use to launch new work on the DPCs 320.

The PPU 200 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 200 is embodied on a single semiconductor substrate. In another embodiment, the PPU 200 is included in a system-on-a-chip (SoC) along with one or more other devices such as additional PPUs 200, the memory 204, a reduced instruction set computer (RISC) CPU, a memory management unit (MMU), a digital-to-analog converter (DAC), and the like.

In an embodiment, the PPU 200 may be included on a graphics card that includes one or more memory devices 204. The graphics card may be configured to interface with a PCIe slot on a motherboard of a desktop computer. In yet another embodiment, the PPU 200 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 4B:
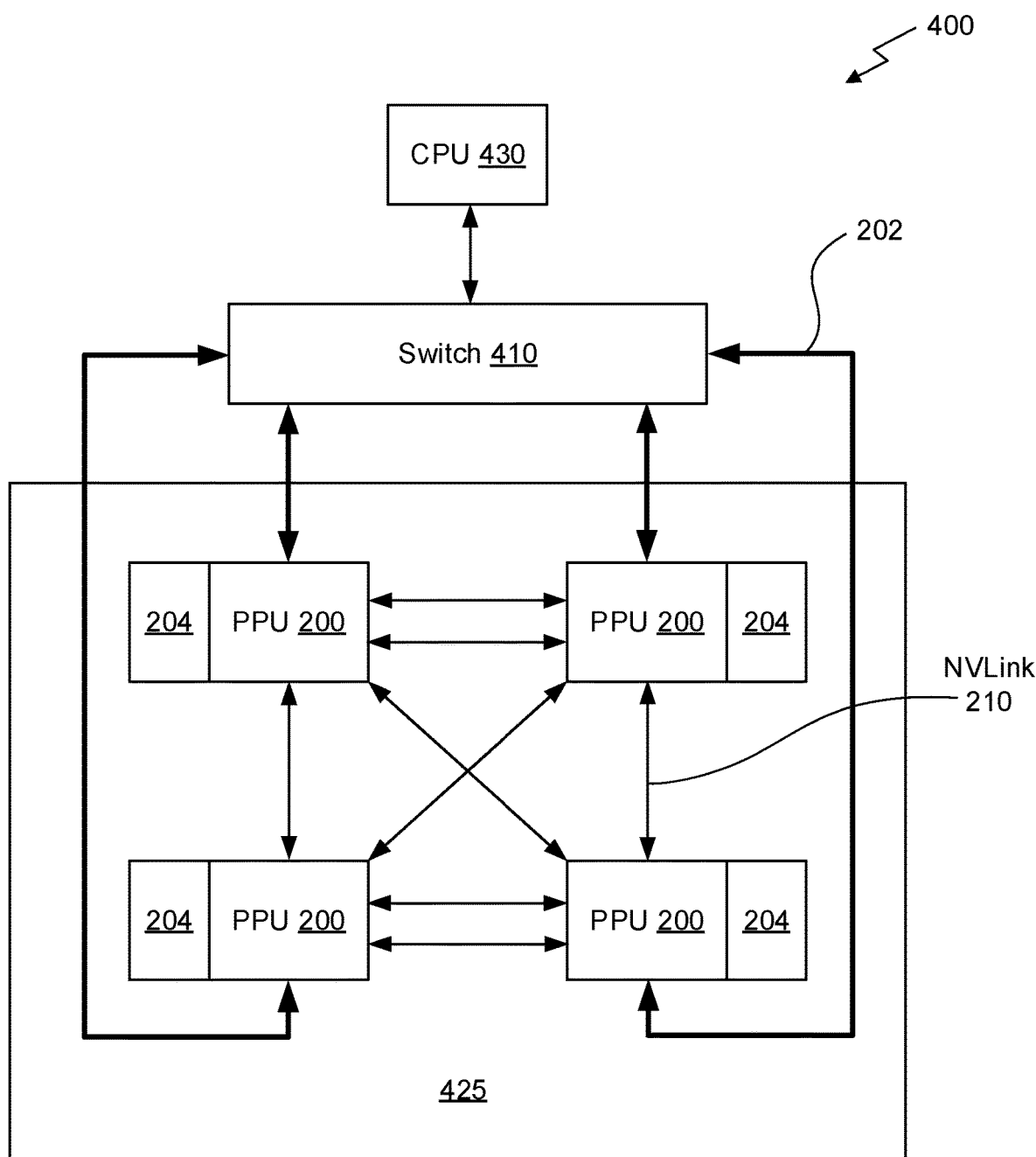
FIG. 4B is a conceptual diagram of a processing system implemented using the PPU of FIG. 2, in accordance with an embodiment.

FIG. 4B is a conceptual diagram of a processing system 400 implemented using the PPU 200 of FIG. 2, in accordance with an embodiment. The exemplary system 465 may be configured to implement the method 100 shown in FIG. 1. The processing system 400 includes a CPU 430, switch 410, and multiple PPUs 200 each and respective memories 204. The NVLink 210 provides high-speed communication links between each of the PPUs 200. Although a particular number of NVLink 210 and interconnect 202 connections are illustrated in FIG. 4B, the number of connections to each PPU 200 and the CPU 430 may vary. The switch 410 interfaces between the interconnect 202 and the CPU 430. The PPUs 200, memories 204, and NVLinks 210 may be situated on a single semiconductor platform to form a parallel processing module 425. In an embodiment, the switch 410 supports two or more protocols to interface between various different connections and/or links.

In another embodiment (not shown), the NVLink 210 provides one or more high-speed communication links between each of the PPUs 200 and the CPU 430 and the switch 410 interfaces between the interconnect 202 and each of the PPUs 200. The PPUs 200, memories 204, and interconnect 202 may be situated on a single semiconductor platform to form a parallel processing module 425. In yet another embodiment (not shown), the interconnect 202 provides one or more communication links between each of the PPUs 200 and the CPU 430 and the switch 410 interfaces between each of the PPUs 200 using the NVLink 210 to provide one or more high-speed communication links between the PPUs 200. In another embodiment (not shown), the NVLink 210 provides one or more high-speed communication links between the PPUs 200 and the CPU 430 through the switch 410. In yet another embodiment (not shown), the interconnect 202 provides one or more communication links between each of the PPUs 200 directly. One or more of the NVLink 210 high-speed communication links may be implemented as a physical NVLink interconnect or either an on-chip or on-die interconnect using the same protocol as the NVLink 210.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 425 may be implemented as a circuit board substrate and each of the PPUs 200 and/or memories 204 may be packaged devices. In an embodiment, the CPU 430, switch 410, and the parallel processing module 425 are situated on a single semiconductor platform.

In an embodiment, the signaling rate of each NVLink 210 is 20 to 25 Gigabits/second and each PPU 200 includes six NVLink 210 interfaces (as shown in FIG. 4B, five NVLink 210 interfaces are included for each PPU 200). Each NVLink 210 provides a data transfer rate of 25 Gigabytes/second in each direction, with six links providing 300 Gigabytes/second. The NVLinks 210 can be used exclusively for PPU-to-PPU communication as shown in FIG. 4B, or some combination of PPU-to-PPU and PPU-to-CPU, when the CPU 430 also includes one or more NVLink 210 interfaces.

In an embodiment, the NVLink 210 allows direct load/store/atomic access from the CPU 430 to each PPU's 200 memory 204. In an embodiment, the NVLink 210 supports coherency operations, allowing data read from the memories 204 to be stored in the cache hierarchy of the CPU 430, reducing cache access latency for the CPU 430. In an embodiment, the NVLink 210 includes support for Address Translation Services (ATS), allowing the PPU 200 to directly access page tables within the CPU 430. One or more of the NVLinks 210 may also be configured to operate in a low-power mode.

Figure 4C:
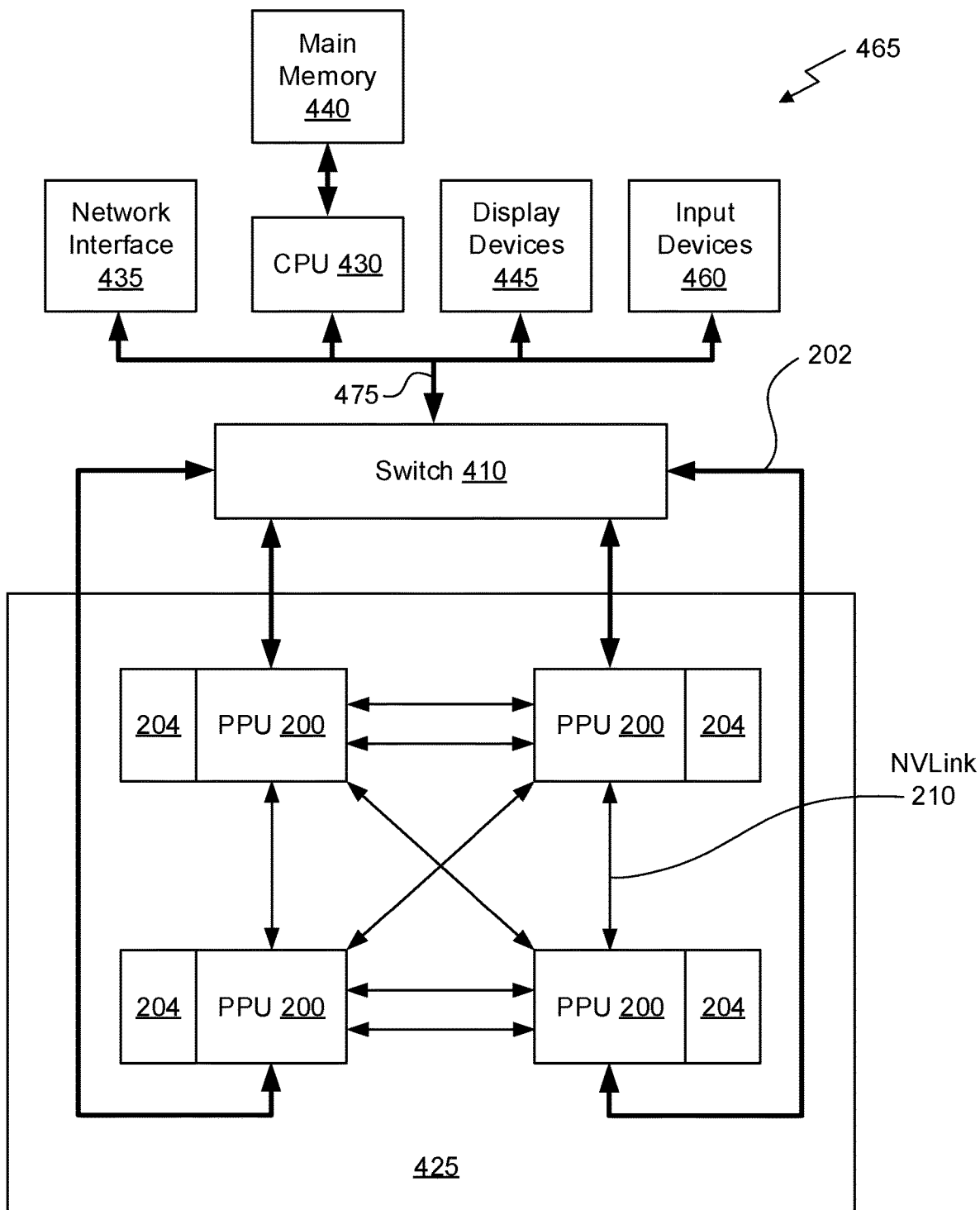
FIG. 4C illustrates an exemplary system in which the various architecture and/or functionality of the various previous embodiments may be implemented.

FIG. 4C illustrates an exemplary system 465 in which the various architecture and/or functionality of the various previous embodiments may be implemented. The exemplary system 465 may be configured to implement the method 100 shown in FIG. 1.

As shown, a system 465 is provided including at least one central processing unit 430 that is connected to a communication bus 475. The communication bus 475 may be implemented using any suitable protocol, such as PCI (Peripheral Component Interconnect), PCI-Express, AGP (Accelerated Graphics Port), HyperTransport, or any other bus or point-to-point communication protocol(s). The system 465 also includes a main memory 440. Control logic (software) and data are stored in the main memory 440 which may take the form of random access memory (RAM).

The system 465 also includes input devices 460, the parallel processing system 425, and display devices 445, i.e. a conventional CRT (cathode ray tube), LCD (liquid crystal display), LED (light emitting diode), plasma display or the like. User input may be received from the input devices 460, e.g., keyboard, mouse, touchpad, microphone, and the like. Each of the foregoing modules and/or devices may even be situated on a single semiconductor platform to form the system 465. Alternately, the various modules may also be situated separately or in various combinations of semiconductor platforms per the desires of the user.

Further, the system 465 may be coupled to a network (e.g., a telecommunications network, local area network (LAN), wireless network, wide area network (WAN) such as the Internet, peer-to-peer network, cable network, or the like) through a network interface 435 for communication purposes.

The system 465 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 440 and/or the secondary storage. Such computer programs, when executed, enable the system 465 to perform various functions. The memory 440, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 465 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 200 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 200. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 200 is a computing platform capable of delivering performance required for deep neural network-based artificial intelligence and machine learning applications.

Exemplary Vision Transformer Pruning Implementation

Figure 5:
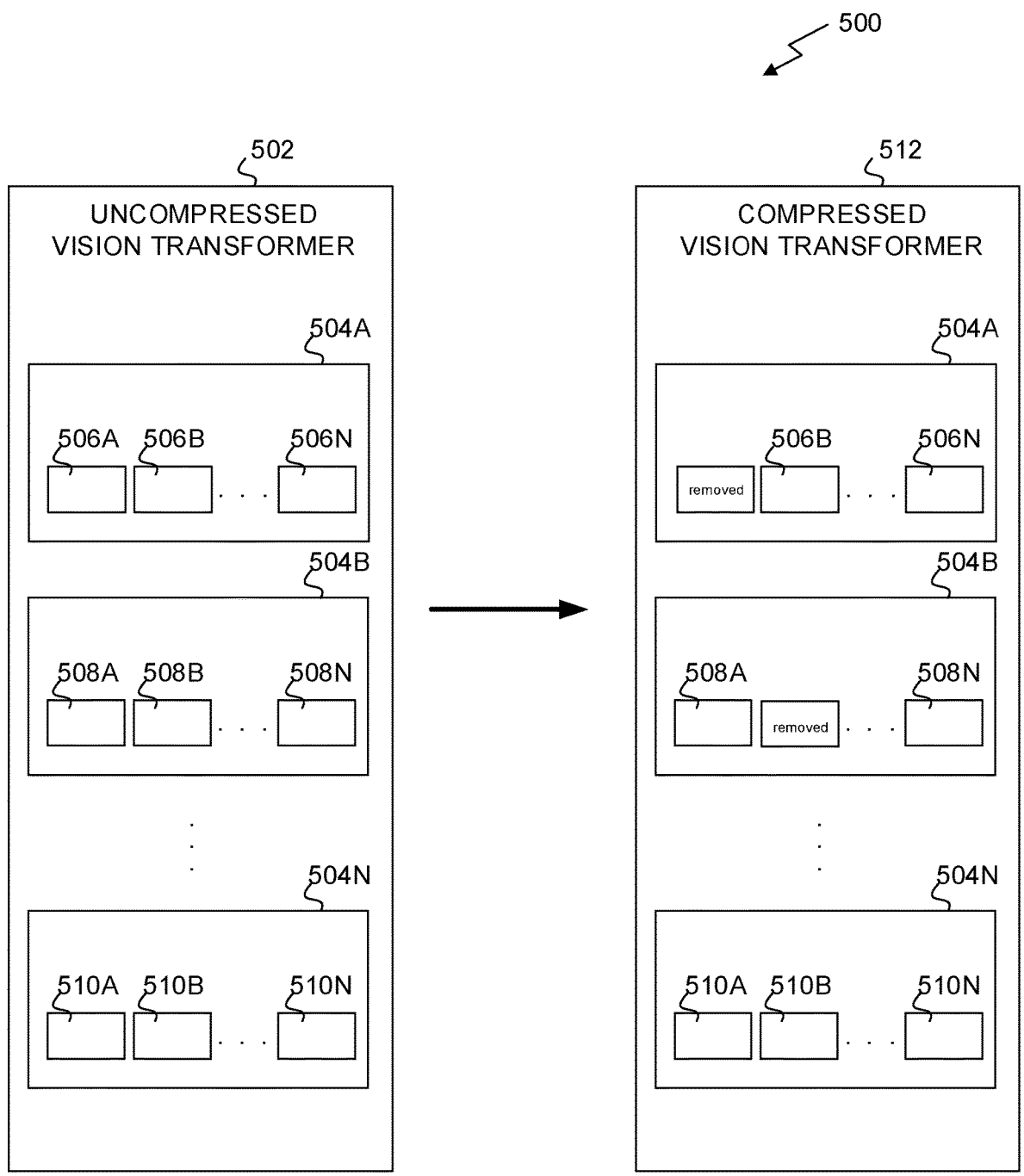
FIG. 5 illustrates an exemplary vision transformer pruning implementation, in accordance with an embodiment.

FIG. 5 illustrates an exemplary vision transformer pruning implementation 500, according to one exemplary embodiment. As shown, an uncompressed vision transformer 502 includes a plurality of blocks 504A-N. Each of the blocks 504A-N includes associated parameters 506A-N, 508A-N, and 510A-N.

Additionally, a global importance ranking may be determined for the parameters 506A-N, 508A-N, and 510A-N, and each score may be compared to one or more predetermined thresholds. In response to determining that a score for one of the parameters 506A-N, 508A-N, and 510A-N does not meet or exceed the predetermined thresholds, the corresponding parameter may be removed from its corresponding block 504A-N of the uncompressed vision transformer 502. For example, a weight associated with the corresponding parameter may be adjusted to zero to remove the parameter.

As shown in the current exemplary implementation 500, it may be determined that a score for a first parameter 506A of a first block 504A does not meet or exceed a predetermined threshold. Additionally, it may be determined that a score for a second parameter 508B of a second block 504B does not meet or exceed a predetermined threshold.

In response, the first parameter 506A of the first block 504A and the second parameter 508B of the second block 504B may be removed to create a compressed vision transformer 512. This compressed vision transformer 512 may have a reduced amount of memory usage increased throughput when compared to the uncompressed vision transformer 502, which may improve a performance of one or more hardware components implementing the compressed vision transformer 512 instead of the uncompressed vision transformer 502.

Pruning Vision Transformers Under Latency Budget and a Method to Distribute Parameters Across Layers Much of the compute time during inference in ViTs is distributed across attention, multi-layer perceptron and heads. By looking at their contribution some can be removed to achieve faster models.

Transformer models offer a unified realm for both NLP and vision tasks but remain large and slow. In response, the vision transformer (ViT) model may be compressed for efficient inference. Specifically, structural pruning may be performed to cover the full design space of ViT, including embedding size, number of heads, projected dimension of each head, and hidden dimension of MLP layers.

In one embodiment, a method for structural pruning of ViTs is provided that that includes grouping parameters for global pruning. For example, the attention matrix may be split to prune different components separately. In another embodiment, a pruning and fine-tuning metric may be applied to ViTs. The metric includes soft loss on the original model, a CNN teacher and hard ground truth labels. In another embodiment, a set of rules may be provided on how to scale different parameters of a model given a specific compute budget.

The proposed implementation does not use a per-layer sensitivity metric to be determined by the user, which may simplify applicability. Additionally, layer pruning may be performed globally. Further, an efficient parameter distribution may be implemented to improve scalability on GPUs. Further still, losses may be unified for an improved outcome during training/fine-tuning.

Within a vision transformer, compressible components may include the following:
  An embedding dimension shared across all blocks, denoted as EMB.
  A number of heads in MSA for every block, denoted as H.
  An output dimension of Q and K projection per head in MSA, denoted as QK.
  An output dimension of V projection and input dimension of the PROJ per head, denoted as V.
  A hidden dimension of MLP per block, denoted as MLP.

Unlike the convolutional layer in CNN which is mainly governed by few dimensions like convolutional kernel size and the number of filters, the attention block of vision transformers contains multiple distinct components (e.g., a QKV projection, multi-head attention, a multi-layer perceptron, etc.), each governed by independent dimension hyperparameters. Thus the dimensionality of each component in each block of the vision transformer needs to be carefully designed to achieve the best tradeoff between efficiency and accuracy.

Additionally, in one embodiment, a latency-aware global structural pruning method is provided to find efficient vision transformer models. A systematic analysis may be performed on all the dimensions that can be independently controlled in a transformer model, which includes the embedding size, number of heads, QK and V dimensions of each head, and the MLP hidden dimension. A global structural pruning algorithm prunes all the components simultaneously in a latency-aware fashion. An importance score incorporating the Taylor importance and the latency reduction of each dimension is utilized so that the score can be comparable across different components and different layers. The dimension with the lowest importance score may be pruned iteratively as the pretrained model is updated so that all the components can be pruned together through a single training process, until a targeted latency is reached.

In addition, a training objective may be provided utilizing the information of the ground truth label, a pretrained CNN teacher and the original full model, which encourage the final model to learn from both the inductive bias of CNN models and the behavior of the original model, further reducing the performance drop in the pruning process.

Furthermore, by observing the pruned model structure from the global pruning process, heuristics may be derived for designing efficient vision transformer models, which outperform current vision transformers when trained from scratch. This heuristic is scalable, and can be scaled in a large range while outperforming current implementations.

In summary, a systematic analysis may be implemented on the prunable components and structure in an image transformer model. Structural pruning may be performed on the dimensions of embedding, number of heads, MLP hidden dimension, and QK and V dimensions of each head separately. Latency-aware pruning criteria may be provided to allow global structural pruning of all the components. A training objective may be provided which combines the information of class label, CNN teacher and the original full model to further boost the accuracy of the pruned model. A design heuristic of the pruned image transformer model may be derived which may enable a family of efficient vision transformer architecture which redistribute the dimension of traditional transformer models to outperform them under similar FLOPS and latency.

Training Objective

In the pruning and fine-tuning process, a CNN hard distillation training objective may be utilized, as shown in Equation (1):

$$\mathcal{L}_{CNN} = \mathcal{L}_{CE}(\Psi(z_c^s), Y) + \mathcal{L}_{CE}(\Psi(z_d^s), Y^{CNN}). \qquad (1)$$

As shown in Equation (1), softmax function is denoted as $\Psi(\cdot)$ and cross entropy loss is denoted as $\mathcal{L}_{CE}$. The logits computed from the class token of the pruned model are denoted as $z_c^s$, and the one computed from the distillation token is denoted as $z_d^s$. $z_c^s$ is supervised by the true label Y, while $z_d^s$ is supervised by the output label of a CNN teacher $Y^{CNN}$ to capture the inductive bias of CNN through attention.

Besides the CNN hard distillation, a full model distillation objective is also considered in the pruning and finetuning process. Here the "full model" stands for the large pretrained model which serves as the starting point of the pruning process. The pruned model may still maintain a similar behavior as the full model, thus the classification logits are distilled from both the class token and distillation token from the pruned model with that of the full model respectively, as formulated in Equation (2):

$$\mathcal{L}_{full} = \mathcal{L}_{KL}(\Psi(\tau z_c^s), \Psi(\tau z_c^t)) + \mathcal{L}_{KL}(\tau z_d^s); \Psi(\tau z_d^t)). \qquad (2)$$

Here we use superscripts t and s to represent the output of a full pretrained model and the model being pruned respectively. $\mathcal{L}_{KL}$ denotes the KL divergence loss, and $\tau$ is the distillation temperature.

The final objective is therefore composed as $\mathcal{L} = \alpha \mathcal{L}_{full} + \mathcal{L}_{CNN}$, where a balances the contribution of the two losses.

Latency Look-Up Table

To enable latency-aware pruning, a latency look up table is needed to efficiently evaluate the latency of the pruned model given all its EMB, H, QK, V and MLP dimensions. The look up table is consisted as the evaluated latency of a single attention block. For a block with arbitrary dimension, its latency is estimated via a linear interpolation of the lookup table. The estimated latency of the full model is computed as the sum of the estimated latency of all the blocks, while omitting the first projection layer and the final classification FC layer.

In one embodiment, a QK/V dimension of all heads may be concatenated by weight. Reshaping these heads allows explicit pruning of the head and aligning of the dimension of each head via structural pruning, which may achieve a lower latency on GPUs.

Pruning Criteria and Procedure

For the pruning criteria, both the first-order Taylor importance and the potential latency improvement provided by pruning each neuron are considered. The pruning criteria is formulated in Equation (3):

$$\mathcal{I}_S(W) = (\sum_{s \in S} g_s w_s) = -\eta(Lat_{full} - Lat_{pruned}). \quad (3)$$

Here s denotes each weight element involved in the dimension group S (all weight elements along one of the EMB, H, QK, V or MLP dimension), $\mathcal{W}_s$ denotes the weight value and $g_s = \partial \mathcal{L} / \partial \mathcal{W}_s$ denotes the gradient of training objective with respect to $\mathcal{W}_s$. The latency improvement is estimated with linearly interpolating a lookup table of attention block latency given the current EMB, H, QK, V and MLP dimension of each block in the pruned model. Note that since the EMB dimension is shared across all blocks, to make the importance comparable with other components the Taylor importance of EMB dimensions may be divided by 12. The Taylor importance of the H dimension may be divided by 6 to encourage head pruning in the model.

The pruning is performed in an iterative manner. The moving average of the importance score $\mathcal{I}_S$ may be computed for all unpruned dimension groups in each training step of the pruned model. Every predefined number of steps, a group of dimensions that has the minimum total importance may be removed. For example, groups may be removed at once, or iteratively with a step of one or more. Only the dimensions of one structural component within one block may be removed in one pruning step. Removed dimensions may not be reactivated in later steps. The pruning process may terminate once the model reaches a desired latency or a desired number of neurons.

The determined model family scales the model by linearly scaling the number of heads and MLP dimension with the EMB dimension, while keeping QK and V of each head unchanged. The dimensions of each structural component are set to be the same among all the attention blocks.

Based on observations made during pruning, the following design heuristics may be derived:
- A number of heads, QK of each head and MLP scales linearly with dimensions of EMB, while V of each head can be kept the same.
- A scaling factor of the head, QK and MLP are not uniform among all blocks: dimensions are larger in the blocks in the middle and smaller towards the two ends.
- The first and last block are important, and require larger dimensions compared to neighboring blocks.
- Reducing dimensions related to the multi-head attention (H, QK, V) while increasing MLP dimension may lead to a more accurate model with similar latency.

A simplified rule may be provided for determining the dimension of each block with the embedding size EMB and a single scaling factor $\epsilon$. EMB may be used as the main driving factor of model scaling because it is shared across all the attention blocks and will lead to the most dramatic change of the overall model size and performance comparing to other structural components. Because the first and last attention blocks are typically more important, their dimensions may be set separately. Table 1 illustrates exemplary details of scaling rules used to redistribute parameters in vision transformers across varying latencies using embedding as a driving factor.

TABLE 1

| Blocks | H | QK | V | MLP |
|---|---|---|---|---|
| DEIT | EMB/64 | 64 | 64 | EMBx4 |
| First/last | 10 | EMB/10 | 64 | EMBx3 |
| Intermediate | εxEMB/100 | εxEMB/20 | 64 | εxEMBx3 |

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising, at a device:
   determining a score for each of a plurality of parameters within each of a plurality of blocks of a vision transformer, wherein the score for each parameter of the plurality of parameters is determined as a function of a loss exhibited when the parameter is removed from the vision transformer and a latency improvement exhibited when the parameter is removed from the vision transformer, and where the latency improvement is determined using a preconfigured latency look-up table; and removing one or more of the plurality of parameters from one or more of the plurality of blocks of the vision transformer, based on the score for each of the plurality of parameters.

2. The method of claim 1, wherein each of the plurality of blocks of the vision transformer includes an attention block.

3. The method of claim 1, wherein each of the plurality of blocks includes the plurality of parameters, the plurality of parameters including:
an embedding dimension shared across all blocks (EMB),
a number of heads in MSA for the block (H),
an output dimension of a Q and K projection per head in MSA (QK),
an output dimension of a V projection and an input dimension of a PROJ per head (V), and
a hidden dimension of MLP per block (MLP).

4. The method of claim 1, wherein all of the plurality of blocks of the vision transformer initially have the same size.

5. The method of claim 1, wherein removing the one or more of the plurality of parameters from the one or more of the plurality of blocks of the vision transformer includes removing a parameter from a first block of the vision transformer while maintaining the parameter in a second block of the vision transformer to result in the first block of the vision transformer and the second block of the vision transformer being of different sizes.

6. The method of claim 1, wherein prior to parameter removal, explicit head alignment is performed by reshaping head components of each of the plurality of blocks.

7. The method of claim 1, wherein:
the score for each of the plurality of parameters is compared to a predetermined threshold, and
in response to determining that a score for a parameter does not meet or exceed the predetermined threshold, the parameter is removed from its corresponding block of the vision transformer.

8. The method of claim 1, wherein removing one or more of the plurality of parameters from one or more of the plurality of blocks of the vision transformer results in a compressed vision transformer.

9. The method of claim 8, wherein the compressed vision transformer is adjusted via explicit head alignment and score-based parameter removal to meet one or more structural constraints of predetermined hardware.

10. The method of claim 8, wherein:
the compressed vision transformer is analyzed to determine one or more heuristics, and
these heuristics are used during a design of a new vision transformer.

11. A system comprising:
a hardware processor of a device that is configured to:
determine a score for each of a plurality of parameters within each of a plurality of blocks of a vision transformer, wherein the score for each parameter of the plurality of parameters is determined as a function of a loss exhibited when the parameter is removed from the vision transformer and a latency improvement exhibited when the parameter is removed from the vision transformer, and where the latency improvement is determined using a preconfigured latency look-up table; and
remove one or more of the plurality of parameters from one or more of the plurality of blocks of the vision transformer, based on the score for each of the plurality of parameters.

12. The system of claim 11, wherein each of the plurality of blocks of the vision transformer includes an attention block.

13. The system of claim 11, wherein each of the plurality of blocks includes the plurality of parameters, the plurality of parameters including:
an embedding dimension shared across all blocks (EMB),
a number of heads in MSA for the block (H),
an output dimension of a Q and K projection per head in MSA (QK),
an output dimension of a V projection and an input dimension of a PROJ per head (V), and
a hidden dimension of MLP per block (MLP).

14. The system of claim 11, wherein all of the plurality of blocks of the vision transformer initially have the same size.

15. The method of claim 1, wherein removing the one or more of the plurality of parameters from the one or more of the plurality of blocks of the vision transformer includes simultaneously removing all components of the vision transformer to be removed via a single training process until a targeted latency is reached.

16. The system of claim 11, wherein prior to parameter removal, explicit head alignment is performed by reshaping head components of each of the plurality of blocks.

17. The system of claim 11, wherein:
the score for each of the plurality of parameters is compared to a predetermined threshold, and
in response to determining that a score for a parameter does not meet or exceed the predetermined threshold, the parameter is removed from its corresponding block of the vision transformer.

18. The system of claim 11, wherein removing one or more of the plurality of parameters from one or more of the plurality of blocks of the vision transformer results in a compressed vision transformer.

19. A non-transitory computer-readable storage medium storing instructions that, when executed by a processor of a device, causes the processor to cause the device to:
determine a score for each of a plurality of parameters within each of a plurality of blocks of a vision transformer, wherein the score for each parameter of the plurality of parameters is determined as a function of a loss exhibited when the parameter is removed from the vision transformer and a latency improvement exhibited when the parameter is removed from the vision transformer, and where the latency improvement is determined using a preconfigured latency look-up table; and
remove one or more of the plurality of parameters from one or more of the plurality of blocks of the vision transformer, based on the score for each of the plurality of parameters.

20. The computer-readable storage medium of claim 19, wherein each of the plurality of blocks of the vision transformer includes an attention block.

* * * * *